Jan. 18, 1938.   J. G. CREED   2,105,636
MEASURING LINE CATCHER
Filed March 13, 1937
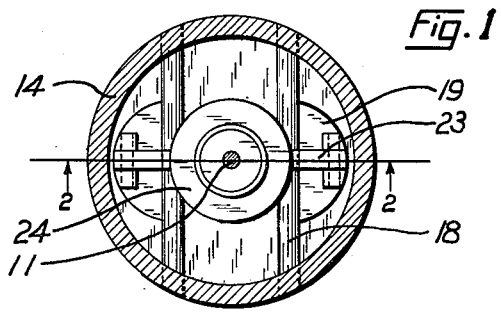
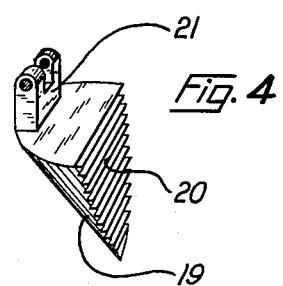
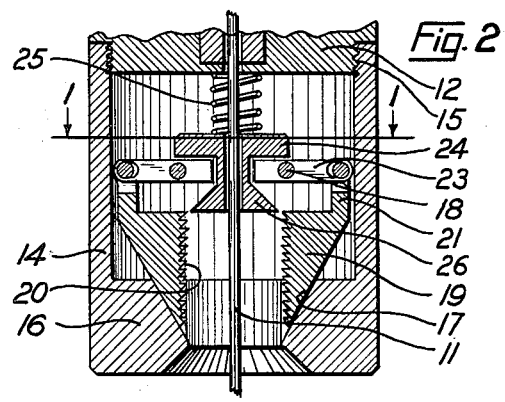
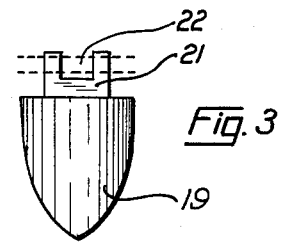
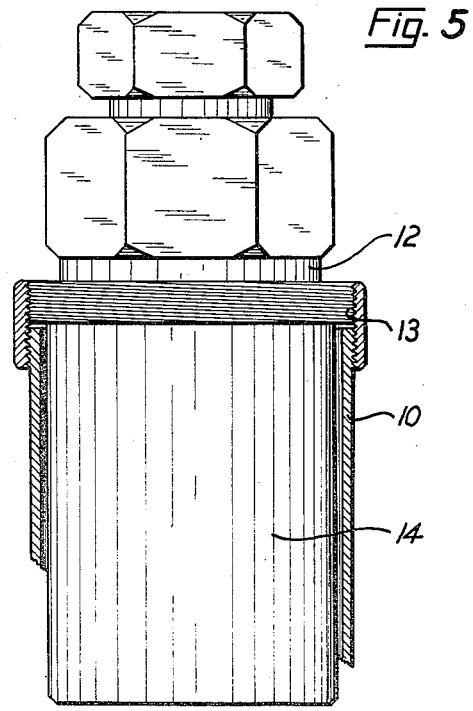
INVENTOR.
James Gordon Creed.
BY Earl Babcock
ATTORNEY Patented Jan. 18, 1938

2,105,636

UNITED STATES PATENT OFFICE 2,105,636

MEASURING LINE CATCHER

James G. Creed, Houston, Tex., assignor to Halliburton Oil Well Cementing Company, Duncan, Okla.

Application March 13, 1937, Serial No. 130,699

4 Claims. (Cl. 24—263)

This invention relates to means for measuring in oil wells, and more particularly to an arrangement for catching a measuring line in a well in the event it breaks.

In the U. S. patents to Halliburton, Nos. 1,369,891 granted March 1, 1921, and 1,692,037 granted November 20, 1928, sounding or measuring devices for oil wells are shown and described. Where used in cementing, as explained in these patents, the measuring line must pass through a stuffing box or packing gland as it enters the top of the well, the fluids in the well being subjected to the pump pressure during cementing.

Now it often happens that in removing a measuring line from the well it kinks, and as the kink enters the stuffing box the measuring line breaks. This sometimes leaves thousands of feet of measuring line in the well, which is difficult to fish out, causes delay, and otherwise interferes with the operations in the well.

It is an object of the present invention to avoid the above difficulty by catching the measuring line in the event it breaks.

It is another object of the invention to provide novel means for causing gripping members to engage a measuring line when a kink in the line approaches a stuffing box as the measuring line passes therethrough.

Other objects and advantages reside in certain novel features of the arrangement and construction of parts, as will be apparent from the following description taken in connection with the accompanying drawing, in which:

Figure 1 is a transverse cross-sectional view of apparatus constructed in accordance with the present invention;

Figure 2 is a vertical cross-sectional view of the apparatus of Figure 1, the view being taken on the line 2—2 thereof;

Figure 3 is a side view of one of the gripping elements employed in the arrangement of Figures 1 and 2;

Figure 4 is a perspective view of one of the gripping elements; and

Figure 5 is a side view of the apparatus showing how it is mounted in a well.

Referring to the drawing in detail, it will be seen that a measuring line is there illustrated at 11, the line passing through a stuffing box or gland structure 12 which may be threaded into a swage nipple 10 as by the screw threads 13. The stuffing box 12 may be of usual construction and may be associated with the measuring line in the manner disclosed in the Halliburton patents mentioned above.

In accordance with the present invention a supporting structure is mounted beneath the stuffing box. This supporting structure may include a cylindrical case or housing 14 screw-threaded to the lower end of the stuffing box at 15. The lower end of the casing is provided with a flanged portion 16 which has inclined or wedge-shaped slots or surfaces 17 which cooperate with the gripping means as will presently be described.

The slots 17 are two in number, are cylindrical in contour and are diametrically disposed in the flanged portion 16. The slots may be formed by drilling through the portion 16 at an angle to the axis of the cylindrical housing 14. If desired the portion 16 may consist of a plug screw-threaded into the lower portion of the housing 14. In that event, the slots 17 may be formed therein by milling prior to assembly with the housing 14.

As best shown in Figure 1, two horizontally extending shafts 18 are secured to the support 14 and constitute means for pivotally mounting two gripping members or slips 19 to the support. A gripping member is shown in detail in Figures 3 and 4 and in cross-section in Figure 2. As there shown, it will be seen that the lower portion of each gripping member has an inclined outer surface of cylindrical contour cooperating with the surface 17 of the support. The inside of each gripping member 19 is provided with a number of teeth 20 adapted to grip the measuring line and firmly hold the same against downward movement, when the gripping members are moved inwardly.

Integral with the main body of each gripping member 19 are upwardly extending lugs 21. Each lug is provided with a recess 22 so that it may be connected to a horizontally extending link 23 pivoted on the shaft 18 as best shown in Figure 1. The links 23 extend inwardly and are adapted to be moved up and down by means of a spool 24 through which the measuring line 11 passes. A coil spring 25 mounted between the lower end of the stuffing box 15 and the top of the spool 24 tends to maintain the parts in the relative position shown in Figure 2. The upper flange of the spool 24 extends outwardly over the shafts 18 so that the action of the spring 25 causes the links 23 to remain horizontal.

The opening or recess 26 in the spool 24 through which the measuring line 11 passes is of such diameter as to allow the measuring line to pass readily therethrough so long as there is no kink in the same but is not large enough to permit a kinked portion of the line to pass therethrough.

The lower flange of the spool 24 has an inclined portion adapted to contact the inner ends of the links 23 to move the same upwardly when the spool is raised by a kink in the measuring line.

The operation of the device is as follows:

So long as the measuring line has no kinks, it may pass readily through the spool 24 and the parts will remain in the position illustrated in Figure 1. Upon a kink contacting the spool 24 as the measuring line is being pulley upward out of the well, the spool is raised against the action of the compression spring 25 and thus raises the inner ends of the links 23. This causes the gripping members or slips 19 to move inwardly and downwardly along the inclined surfaces 17 and grip the measuring line below the kink. There is sufficient play in the system between the links 23 and the lugs 21 to enable the gripping members to pass downwardly and inwardly in this manner.

Due to the tension in the measuring line and due to the weakened condition of the line at the kink, it will probably break, but inasmuch as the gripping members have engaged the same beneath the kink the portion of the line therebeneath will not be lost in the well. The stuffing box may then be removed and the lower portion of the line removed from the well.

While only one embodiment of the invention has been shown and described herein, it is obvious that various changes may be made without departing from the spirit of the invention or the scope of the annexed claims.

I claim:

1. The combination with an oil well or the like and a measuring line of a device for catching the line in the event it breaks, said device comprising line gripping means, control means for normally holding said line gripping means adjacent to and spaced radially from the line and means including a member having a restricted opening therein through which the line may be passed for actuating said control means upon breakage of the line to cause the gripping means to engage the line beneath the point of breakage.

2. The combination with an oil well or the like and a measuring line of a device for catching the line in the event it breaks, said device comprising a support, a plurality of gripping members mounted on the support for radial movement with respect to the line, spring pressed mechanism tending to hold said gripping members spaced from said line and a device associated with said line for controlling said mechanism to cause the gripping members to engage the line upon breakage of the same.

3. The combination with an oil well or the like and a measuring line of a device for catching the line in the event it breaks, said device comprising a support, a plurality of gripping members mounted on the support, said gripping members and support having cooperating portions enabling the gripping members to move inwardly and downwardly or outwardly and upwardly with respect to the support, spring pressed mechanism tending to hold said gripping members outwardly and upwardly on said support and a device associated with said line for controlling said mechanism to cause the gripping members to move inwardly and downwardly and thus engage the line upon breakage of the same.

4. The combination with an oil well or the like and a measuring line of a device for catching the line in the event it breaks, said device comprising a support, a plurality of gripping members mounted on the support, said gripping members and support having cooperating portions enabling the gripping members to move inwardly and downwardly or outwardly and upwardly with respect to the support, spring pressed mechanism tending to hold said gripping members outwardly and upwardly on said support and a device associated with said line for controlling said mechanism to cause the gripping members to move inwardly and downwardly and thus engage the line upon breakage of the same, said controlling device consisting of a spool having a restriction therein through which the line passes, the restriction being of such size as to permit the passage of unkinked line therethrough but not a kinked portion of the line.

JAMES G. CREED.